United States Patent
Zhang et al.

(10) Patent No.: US 10,810,305 B2
(45) Date of Patent: Oct. 20, 2020

(54) SECURING UNTRUSTED CODE USING MEMORY PROTECTION KEY AND CONTROL FLOW INTEGRITY

(71) Applicant: Intel Corporation, Santa Clara, CA (US)

(72) Inventors: Mingwei Zhang, Hillsboro, OR (US); Ravi Sahita, Portland, OR (US)

(73) Assignee: Intel Corporation, Santa Clara, CA (US)

(*) Notice: Subject to any disclaimer, the term of this patent is extended or adjusted under 35 U.S.C. 154(b) by 259 days.

(21) Appl. No.: 15/899,229

(22) Filed: Feb. 19, 2018

(65) Prior Publication Data

US 2019/0042733 A1 Feb. 7, 2019

(51) Int. Cl.
| | | |
|---|---|---|
| G06F 21/53 | (2013.01) | |
| G06F 21/54 | (2013.01) | |
| G06F 12/14 | (2006.01) | |
| G06F 21/52 | (2013.01) | |
| G06F 9/30 | (2018.01) | |
| G06F 3/06 | (2006.01) | |

(52) U.S. Cl.
CPC ............ *G06F 21/53* (2013.01); *G06F 3/0637* (2013.01); *G06F 9/3005* (2013.01); *G06F 12/14* (2013.01); *G06F 21/52* (2013.01); *G06F 21/54* (2013.01)

(58) Field of Classification Search
CPC ...... G06F 21/53; G06F 3/0637; G06F 9/3005; G06F 12/14; G06F 21/52; G06F 21/54
See application file for complete search history.

(56) References Cited

U.S. PATENT DOCUMENTS

| 10,089,223 | B1* | 10/2018 | Kurmus | G06F 12/1441 |
| 2006/0277539 | A1* | 12/2006 | Amarasinghe | G06F 21/54 |
| | | | | 717/168 |
| 2015/0254017 | A1* | 9/2015 | Soja | G06F 3/0622 |
| | | | | 711/103 |

OTHER PUBLICATIONS

B. Patel, Intel Releases New Technology Specifications to Protect Against ROP attacks, Jun. 9, 2016, Intel (Year: 2016).*
U.S. Appl. No. 15/459,640, entitled "Technologies for Protecting Dynamically Generated Managed Code with Protection Domains", filed Mar. 15, 2017, 43 pages of specification and drawings.
U.S. Appl. No. 15/720,083, entitled "Technologies for Untrusted Code Execution with Processor Sandbox Support", filed Sep. 29, 2017, 37 pages of specification and drawings.

* cited by examiner

*Primary Examiner* — Lynn D Feild
*Assistant Examiner* — Vladimir I Gavrilenko
(74) *Attorney, Agent, or Firm* — Jordan IP Law, LLC

(57) ABSTRACT

Systems, apparatuses and methods may provide technology for securing untrusted code using memory protection keys and control flow integrity, by applying a memory protection key to one or more memory regions, enforcing control flow integrity with respect to the one or more memory regions, and executing untrusted code in an isolated region of the one or more memory regions.

20 Claims, 12 Drawing Sheets

FIG. 3

```
void main()
{
        int real_prot = PROT_READ | PROT_WRITE;

int pkey = pkey_alloc();

char * ptr = mmap(NULL, PAGE_SIZE, PROT_NONE,
                    MAP_ANONYMOUS|MAP_PRIVATE, -1, 0);

ret = pkey_mprotect(ptr, PAGE_SIZE, real_prot, pkey);

pkey_set(pkey, PKEY_DISABLE_WRITE, 0);

*ptr = 0x30;
                        }
```

SECURING UNTRUSTED CODE USING MEMORY PROTECTION KEY AND CONTROL FLOW INTEGRITY

TECHNICAL FIELD

Embodiments generally relate to executing untrusted code in a trusted environment (e.g., a sandbox or one or more memory regions). More particularly, embodiments relate to applying a memory protection key and enforcing control flow integrity to ensure secure execution of code.

BACKGROUND

Trusted computing bases (TCBs) have gotten larger as software systems have gotten more complicated. Adding new components such as interpreted code (Java/JavaScript) run by Just-In-Time (JIT) compilation engines and native plug-in library code modules from third parties has increased the possibility of security risks. In particular, these component modules, when coming from an outside source and executed, even if they are verified (code-signed), may still bring about more information leakage or memory corruption that may further cause privilege escalation through code reuse attacks, such as a Return Object Programming attack or Jump Oriented Programming attack. Such issues may be due to poor code quality and/or malicious input. Separating untrusted code execution from the remaining trusted code may be difficult and often at high cost of performance overhead (see, e.g., Google Native Client). For these reasons, conventional sandbox boundaries remain at ring level, where a CPU uses a protection ring as a separation technique to isolate software from the operating system.

BRIEF DESCRIPTION OF THE DRAWINGS

The various advantages of the embodiments will become apparent to one skilled in the art by reading the following specification and appended claims, and by referencing the following drawings, in which:

FIG. 3 is an example of a programming function in which buffer data is attached with a protection key;

DESCRIPTION OF EMBODIMENTS

Figure 1:
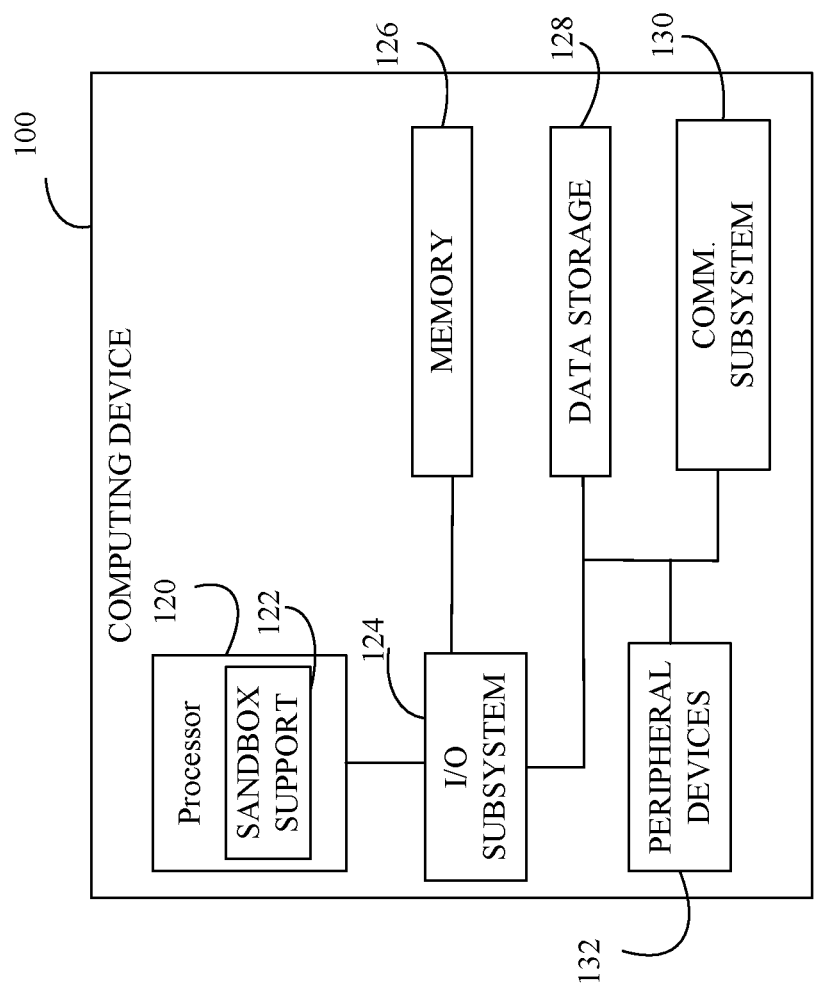
FIG. 1 illustrates an example of a simplified block diagram of a computing device/system for untrusted code execution according to an exemplary embodiment.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Conventional technologies for protecting particular code and data provide features in which a sandbox is created for program execution. However, while such technology may share the same goal of this disclosure of securing untrusted code execution, what conventional technology may do is to isolate trusted code/data so that unauthorized accesses are denied. This may be an appropriate solution when the trusted code and data size is small or when cross-domain control transfers are low in frequency, but this solution is not optimal when the scenario is the opposite, where untrusted code is plugin-code while trusted code represents a framework-like platform where control transfer between plugins and the framework is intensive.

Conventionally, there are existing systems for executing untrusted code, including: 1) Google Native Client (NaCl); and 2) other sandboxing technology that use memory protection keys.

Google NaCl is purely a software solution, in which Google's own compiler and related tools are required. Accordingly, a significant amount of support and maintenance must be devoted to these tools, which directly affect costs. An additional problem with Google NaCl is that runtime performance issues may occur.

Also, when sandboxing using only memory protection keys, there is no ability to constrain control flow transfers, and the sandboxing can be by-passed. Memory protection keys only prevents sandbox memory read/write operations but do not prevent 'jumping' out of sandboxes. Moreover, conventional sandboxing technology may require the use of new hardware managed components. In contrast with conventional sandboxing technology, exemplary embodiments of the instant disclosure may not require new hardware mechanisms.

There are key differences between the above-described conventional technology and at least one exemplary embodiment described in this disclosure. For example, compared to Google NaCl, an exemplary embodiment may be secure, while Google NaCl may suffer from sandbox escape—for instance, a valid domain switch may rely on the code inside the sandbox to set a constant value to a set of registers (e.g., ebx, esi and edi). These registers may be checked when control transfers to outside of the sandbox. If attackers can guess the constant value and find sufficient gadgets or tools that set the constant value to the correct registers, attackers may bypass the domain switch checking. In addition, the system of Google NaCl does not check control flow within a sandbox, therefore attackers may discover gadgets located in the middle of instructions. See Code Table 1 below.

CODE TABLE 1

| Code within the square is a gadget | | |
| --- | --- | --- |
| text: 209B9F42 | mov | eax, [ecx+4] |
| text: 209B9F45 | test | eax, eax |
| text: 209B9F47 | jz | short loc_209B9F57 |
| text: 209B9F49 | push | eax |
| text: 209B9F4A | mov | eax, dword_2128C66C |
| text: 209B9F4A; | --------- | --------- |
| text: 209B9F4F | db 0FFh | |
| text: 209B9F50; | --------- | --------- |
| text: 209B9F51 | push | eax |
| text: 209B9F52 | pop | esp |
| text: 209B9F53 | pop | ecx |
| text: 209BF56 | movzx | eax, ax |
| | retn | |

Relative to the above-discussed conventional technology, exemplary embodiments may present more efficient solutions, which include the addition of memory protection key and control flow integrity technology, backed by hardware CPU features. The efficiency may be based on at least three factors: 1) all JIT code is executed natively without overhead except control flow integrity technology, 2) untrusted code such as JIT code may be frequently updated by tweaking memory protection key permissions instead of real memory permissions—for example, according to an exemplary embodiment, changing the permission of 4 GBs of memory in 1000 noncontiguous regions requires only 60-70 cycles, while in comparison, using a system call like mprotect causes 16 million cycles, and 3) frequent cross boundary control transfers will not generate significant overhead due to fast memory protection key domain switching and very little control flow integrity overhead. According to an exemplary embodiment, an additional part of the process may include memory protection key-related instructions that switch the memory permission.

Control flow integrity technology may include defining a second stack (shadow stack) exclusively used for control transfer operations, in addition to a traditional stack used for control transfer and data. When control flow integrity technology is enabled, a CALL instruction may push a return address into a shadow stack in addition to its normal behavior of pushing a return address into a normal stack (with no changes to traditional stack operation). The return instructions (e.g. RET) may pop the return address from both shadow and traditional stacks, and may only transfer control to a popped address if return addresses from both stacks match. There may be restrictions to write operations to the shadow stack to make it harder for attackers to modify return addresses on both copies of stack. Essentially, it is impossible to corrupt the shadow stack at an attackers' privilege level (ring level). Thus, shadow stack usage may be limited to call and return operations for the purpose of storing the return address only.

Control flow integrity technology may also include a new "endbranch" instruction being added to ISA to mark a legal target for an indirect branch or jump. Thus, if ISA having an "endbranch" instruction is not a target of indirect branch or jump, the CPU may generate an exception indicating unintended or malicious operation.

Memory protection keys may be used to control access to memory on a per-page basis. When this feature is enabled, four bits in each page-table entry may be used to assign one of sixteen "key" values to any given page. For some processors, there may be a register with two bits for each key value. Setting a "write disable" bit for a given key may block all attempts to write a page with that key value, while setting the "access disable" bit may block all reads as well. Memory protection keys may allow a process to partition its memory into a maximum of sixteen regions and to selectively disable or enable access to any of those regions. The control register may be local to each thread, so different threads may enable or disable different regions independently. Applications may set the page keys using any of the system calls that set the other page protections—mprotect( ), for example. As described below, the instant disclosure details the implementation of memory protection key technology along with control flow integrity technology to provide a level of protection for untrusted code.

According to an exemplary embodiment, each untrusted code module may be provided in a small but efficient sandbox domain while the remaining trusted code may exist in an external domain. While all domains may be within the same process address space, all cross-domain data accesses and code transfers may be restricted by policies.

Establishing a sandbox may include providing one or more memory regions that allow secure execution of code. Code that is executed inside the sandbox may have its memory accesses and control flow transfers completely constrained to allowed locations. A CPU memory protection key technology may constrain memory access to allowed locations, but does not constrain control flow transfers. That is, even if a page is protected with a memory protection key as non-accessible, the page may still be executed. On the other hand, control flow integrity technology may constrain control flow transfers to allowed locations. According to an embodiment, combining memory protection key technology with control flow integrity technology may produce a secure environment for execution of untrusted code.

An exemplary embodiment may combine memory protection key technology with control flow integrity technology to produce a lightweight sandbox for safe execution of untrusted code including JIT code and untrusted plugin-code. A lightweight sandbox may be an isolation technology, where performance is good (i.e., control flow transfers across domains are safe and efficient). The untrusted code and trusted code may be isolated into two memory domains by implementing memory protection key technology along with control flow integrity.

Furthermore, for transfer control across domains, trampoline functions may be used to combine memory protection key technology and control flow integrity. Trampoline functions ensure that control transfers between two domains are secure.

Systems and methods, according to exemplary embodiments, may extend security features on emerging CPUs and attract more users. Furthermore, customers may be protected from malicious exploits on their machines using CPUs in which memory protection key technology is combined with control flow integrity technology according to exemplary embodiments.

Referring now to FIG. 1, an illustrative computing device 100 for managed code execution with protection domain support includes a processor 120 with sandbox support 122. In use, as described in more detail below, the computing device 100 executes unprivileged code (e.g., user-level code) from a native domain in a native processor mode. The computing device 100 may add memory pages to one or more sandbox domains and then jump to an entry point within the sandbox domain using the sandbox support 122. The computing device 100 executes the code within the sandbox domain in a sandbox processor mode, in which memory accesses outside of the sandbox domain as well certain processor instructions are disallowed. The computing device 100 may jump back to the native domain using the sandbox support 122. The native domain and the sandbox domains may be included in the same virtual address space. Thus, the computing device 100 may enable user-level configuration and management of multiple untrusted sandbox domains. The computing device 100 may provide memory protection for different domains in the same address space, without requiring potentially expensive context switches or permission level changes (e.g., ring level changes, hypercalls, or other security boundary crossings). The computing device may improve performance for certain applications, particularly for workloads that perform frequent cross-boundary interactions. Additionally, the computer device 100 may perform sandbox isolation without extensive, specialized toolchain support (e.g., without extensive changes to the compiler, linker, or other toolchain components) and, by removing software overhead, may provide improved performance over software-only isolation techniques.

The computing device 100 may be embodied as any type of device capable of predictable dynamic address assignment and otherwise performing the functions described herein. For example, the computing device 100 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device. As shown in FIG. 1, the illustrative computing device 100 includes the processor 120, the 1/0 subsystem 124, a memory 126, and a data storage device 128. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 includes the sandbox support 122. The sandbox support 122 may be embodied as any hardware, firmware, microcode, other resources of the processor 120 that provides sandbox protection as further described below. For example, the sandbox support 122 may include instruction set architecture (ISA) extensions, model-specific registers, and/or other processor features to support configuration of sandbox domains, entering and exiting sandboxing domains, and enforcing sandbox protections.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. As described above, in operation, the memory 126 includes page tables used for paging and virtual memory address translation, and the page table entries may include protection domain identifiers. The memory 126 is communicatively coupled to the processor 120 via the 1/0 subsystem 124, which may be embodied as circuitry and/or components to facilitate input/output operations with the processor 120, the memory 126, and other components of the computing device 100. For example, the 1/0 subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the 1/0 subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 130, which may be embodied as any communication circuit, device, or collection thereof, capable of enabling communications between the computing device 100 and other remote devices over a computer network (not shown). The communications subsystem 130 may be configured to use any one or more communication technology (e.g., wired or wireless communications) and associated protocols (e.g., Ethernet, Bluetooth®, Wi-Fi®, WiMAX, LTE, etc.) to affect such communication.

As shown, the computing device 100 may further include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
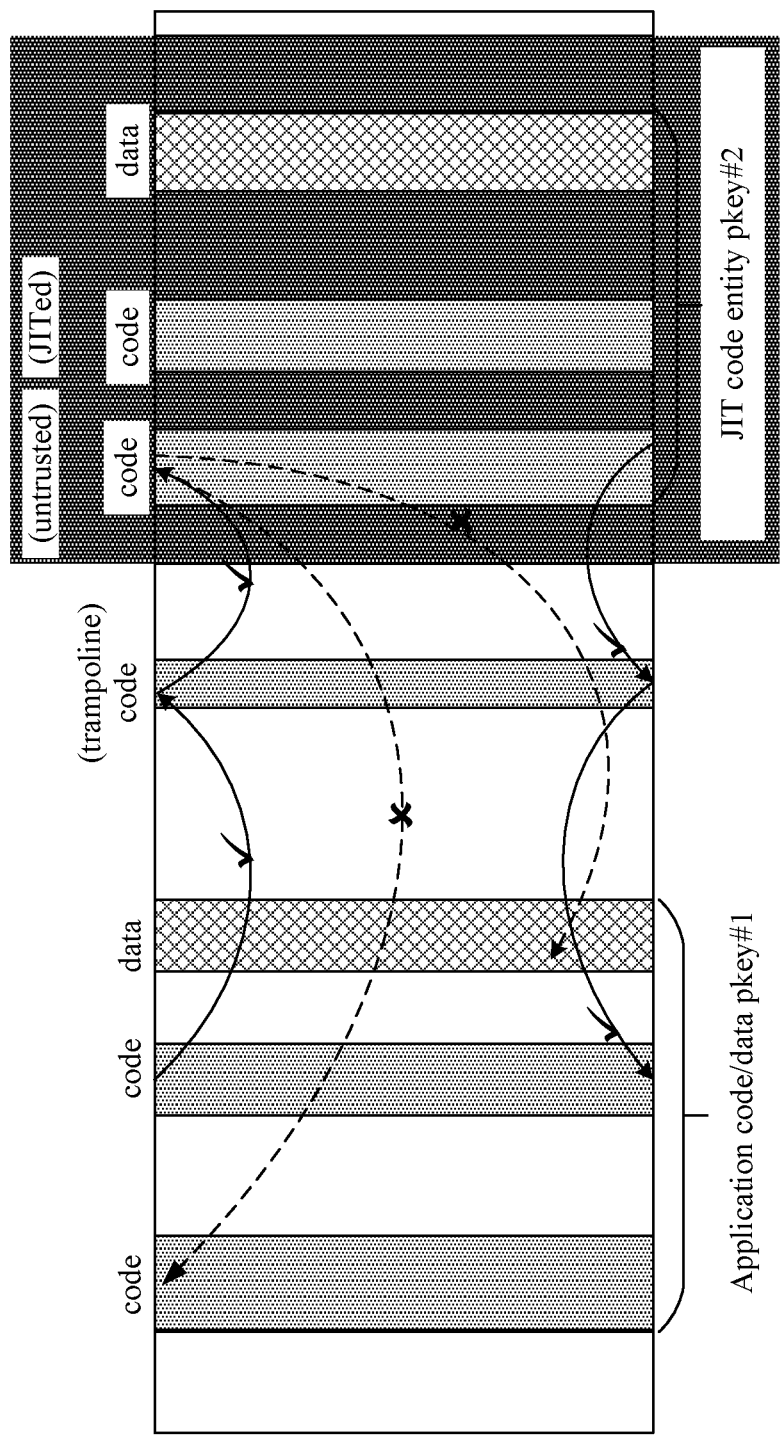
FIG. 2 illustrates an example of connections between untrusted code inside of a trusted environment and trusted code outside of the trusted environment.

Turning now to FIG. 2, where an exemplary embodiment of workflow of a system, or a device as illustrated in FIG. 1, in which untrusted code is separated from secure code by using two protection keys (pkeys), is shown. That is, FIG. 2 illustrates a combination of memory protection key and control flow integrity technology. In FIG. 2, all code executing inside the untrusted code sandbox may not access outside memory and may not execute code (e.g., application code) outside of the sandbox. Also, trusted application code that is executed outside of the untrusted code sandbox may not directly access memory inside of the untrusted code sandbox and may not be executed inside of the sandbox. Trampoline code may be the connection between the untrusted and trusted code. The trampoline code may provide instructions for communication or control transfer between untrusted and trusted code. Trampoline code may also protect the application code.

If one only uses memory protection keys as opposed to the combination of memory protection keys and control flow integrity technology, only specific code is prevented from accessing particular memory. Memory protection keys do not protect against indirect jumps between untrusted code within a sandbox and trusted application code outside of the sandbox. In other words, memory protection keys do not constrain indirect jumps/calls that cross untrusted/trusted domains. Therefore, internal functions of a trusted domain could be reached unintentionally, causing memory corruptions in the trusted domain or even malicious change of protection key setting.

Similarly, the use of only control flow integrity technology, or control flow constraints, has its own deficiencies. For example, using only control flow integrity may prevent attackers from jumping to arbitrary locations of the application code, however attackers may be allowed to jump to any code having an "endbranch" instruction.

According to the instant disclosure, securing untrusted code by combining memory protection key technology with control flow integrity may involve different aspects of code isolation, cross-domain control flows, and cross-domain data sharing.

Data isolation may be implemented as shown in FIG. 3 as a technique for securing untrusted code, where the last instruction in the pseudo code of FIG. 3 (*ptr=0x30) may generate a memory write that may fault due to a memory protection key violation. FIG. 3 only shows a data buffer attached with a protection key. Differently, according to an exemplary embodiment, memory protection is applied to all code and data memory regions of both untrusted and trusted code. This may be achieved by intercepting all memory related system calls such as mmap(2), in all user runtime libraries including libc.so and dynamic loader ld.so. By doing so, all trusted code may be controlled by one protection key (see protection key #1 in FIG. 2), and untrusted code may be protected by a separate protection key (see protection key #2 in FIG. 2).

Data isolation alone may provide only a modicum of protection since even if a code page is marked as "PKEY_DISABLE_ACCESS", code inside that page may still be executed since memory key protection is designed to prevent only memory accesses instead of code execution. Accordingly, since the use of memory protection keys prevents only memory accesses instead of code execution, to effectively thwart attacks, an exemplary embodiment combines control flow integrity technology with memory protection keys by requiring that both untrusted and trusted code are control-flow-integrity-enabled. That is, an "endbranch" instruction may be added in all indirect jump/call targets. This requirement may be achieved by program instrumentation at compiler or binary level. Further, to combine memory protection key protection and control flow integrity technology, additional memory instructions may be added after each "endbranch" instruction according to an exemplary embodiment.

Figure 4:
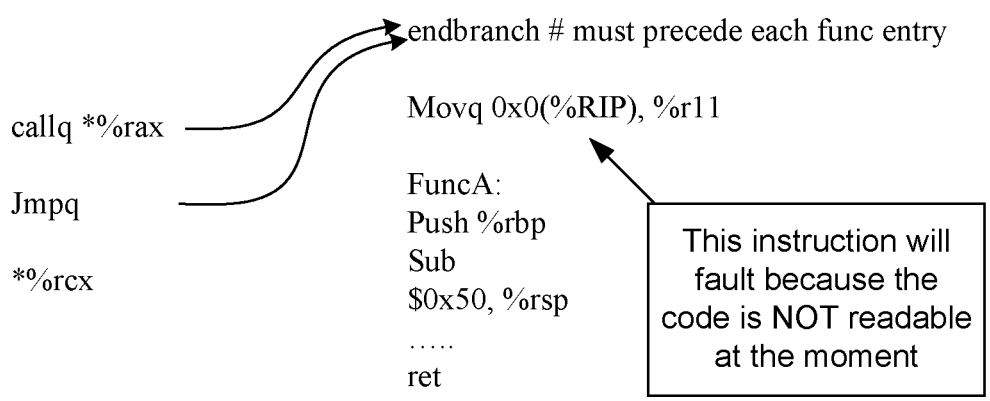
FIG. 4 is an illustration of an example of pseudo-code related to isolating code using control flow integrity according to an embodiment.

An additional memory read instruction may be added to indirect jump/call targets using program instrumentation just after each "endbranch" instruction. By doing so, untrusted code may still jump to trusted code locations and vice versa because control flow integrity technology may allow such without going through trampoline code as indicated in FIG. 2. Doing so, however, may cause a fault on a second instruction which simply does a fake memory read on the current code page, as demonstrated in FIG. 4.

Figure 5:
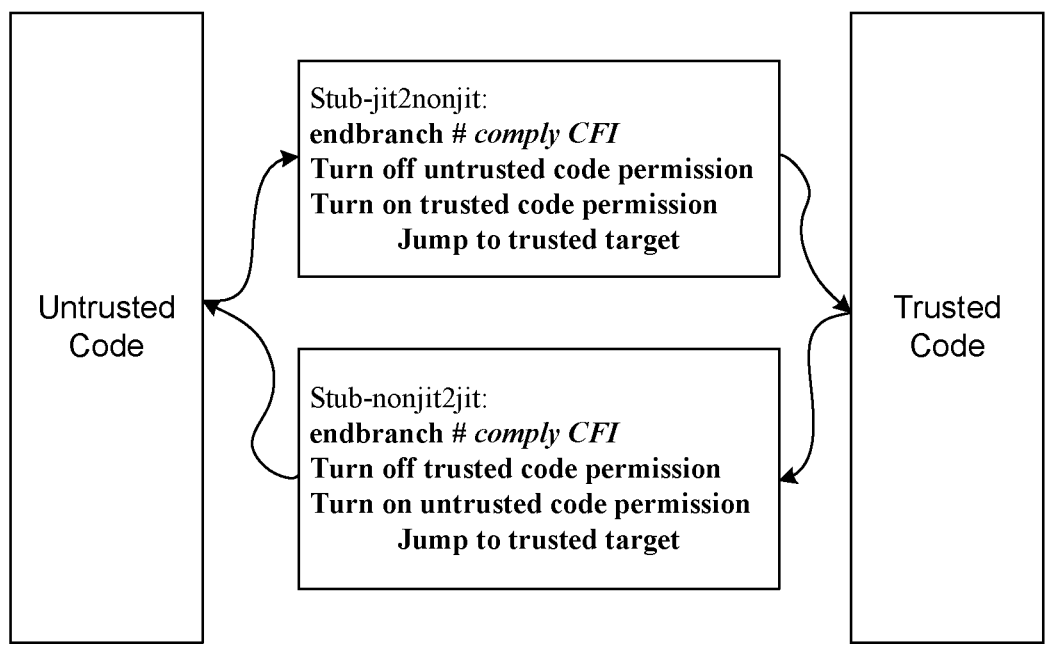
FIG. 5 is an illustration of an example of pseudo-code related to cross domain control transfers according to an embodiment.

Cross domain control transfer is shown in FIG. 5. Although the picture shows pseudo code, each trampoline only contains 4 instructions as each pseudo code line maps to exactly one x86 instruction. This cross-domain transfer will be extremely efficient on runtime performance.

Cross domain data access is essentially needed when a data chunk is required to pass from one domain to another domain. When the transfer of a data chunk occurs, an untrusted code domain may temporarily get access permission of a data chunk that belongs to another domain. One way to prevent unwanted access to data chunks passing between domains is to perform data copying. However, such mechanism may generate a significant amount of overhead and could make such methodology useless.

To address this issue, an exemplary embodiment implements memory protection keys to allow two domains to share one extra pkey that is mapped to a memory chunk. Thus, when a data chunk of data sharing is needed, this additional pkey may be used to control the permission of that particular memory. In addition, the code in other domains that is not involved in the data sharing cannot access this extra pkey mapped memory. In other words, respective pkeys may be used to secure different domains, however an additional pkey may be used to secure a particular portion of memory ('pkey mapped memory') in which the data chunk is stored. The additional pkey may be shared with each of the domains involved with the data sharing. Additionally, two pkeys may be provided for each domain—one pkey specific to the domain and an additional pkey specific to a particular portion of memory within a domain. The recitation of two pkeys per domain is only exemplary and the number of pkeys provided per domain are not limited to only two.

Figure 6A:
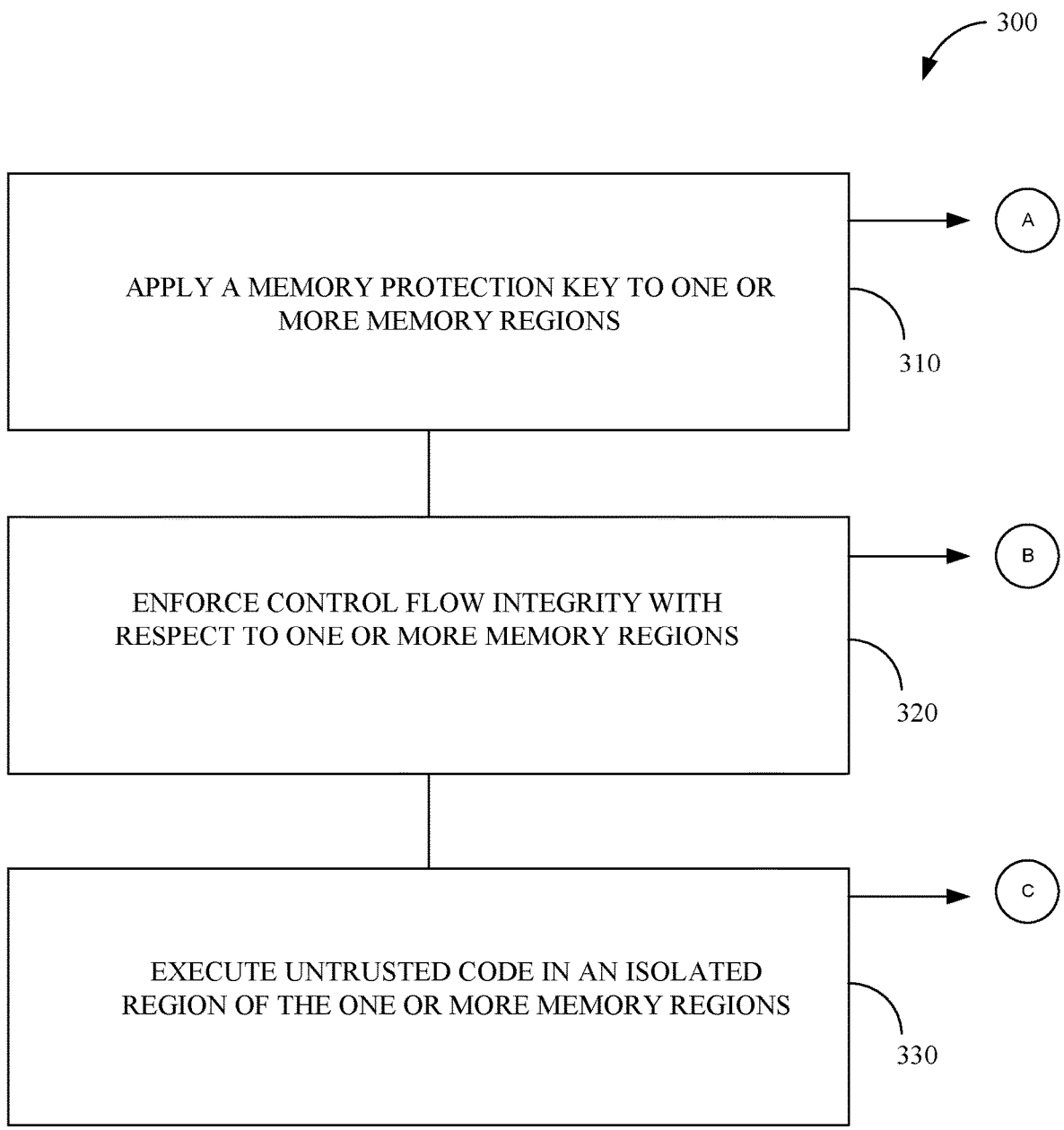
FIGS. 6A-6D illustrated exemplary operation blocks related to a method of securing untrusted code according to an embodiment.

Referring now to FIG. 6A, the computing device 100 or computing system may execute a method 300 for securing untrusted code by combining the use of memory protection keys with control flow integrity. It should be appreciated that, in some embodiments, the blocks of the method 300 may be performed by one or more components, including one or more processors, of the computing device as shown in FIG. 1. In the following description, numerous specific details are set forth. It is understood, however, that embodiments may be practiced without these specific details. In other instances, well-known circuits, structures and techniques have not been shown in detail in order to not obscure the understanding of this description.

Figure 6B:
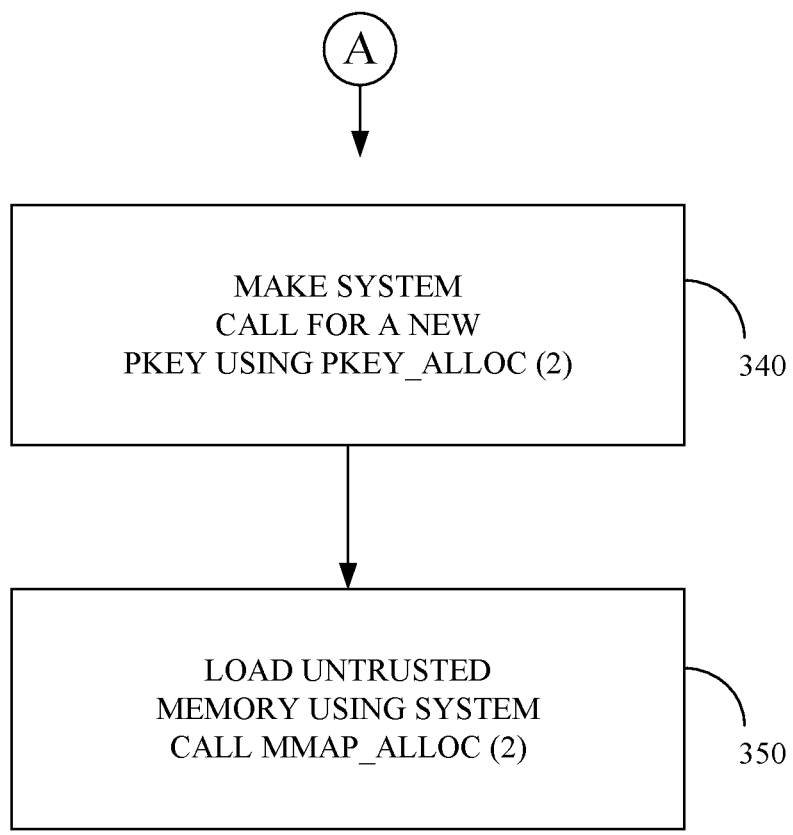

In block 310, the computing device 100 may apply one or more memory protection keys to one or more memory regions. For example, in block 340 of FIG. 6B, an application may use system call pkey_alloc(2) to get a new pkey. Then untrusted memory may be loaded using system call mmap(2) (block 350).

Figure 6C:
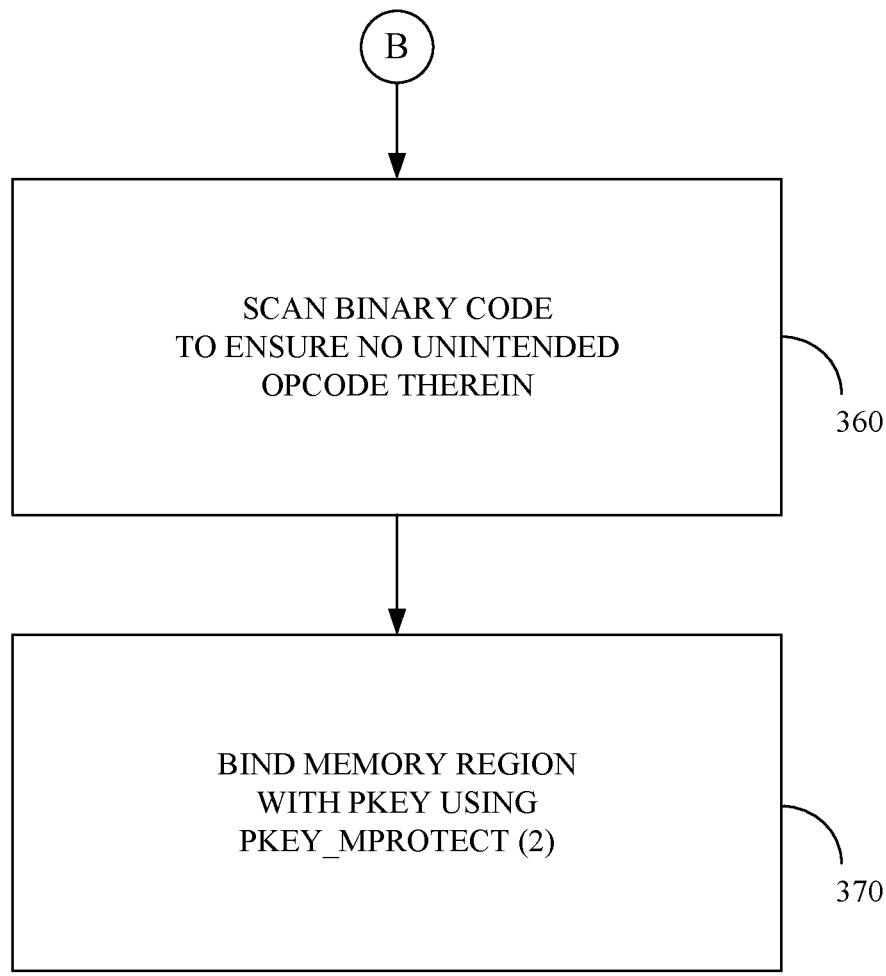

In block 320 of FIG. 6A, the computing device 100 may enforce control flow integrity with respect to one or more memory regions. For example, after untrusted binary code is loaded, application code may scan the binary code to ensure that no unintended opcode appears inside the binary code (block 360 of FIG. 6C). For instance, "wrpkru", "xsave" and system call instructions (such as int, syscall, sysenter, etc.) may cause resetting of a memory protection key state. These instructions may be avoided. After code scanning, the application code may bind the memory region with the pkey using pkey_mprotect(2) (block 370 of FIG. 6C). Note that if untrusted code occupies more than one region, application code may use the same system call to bind them respectively.

Figure 6D:
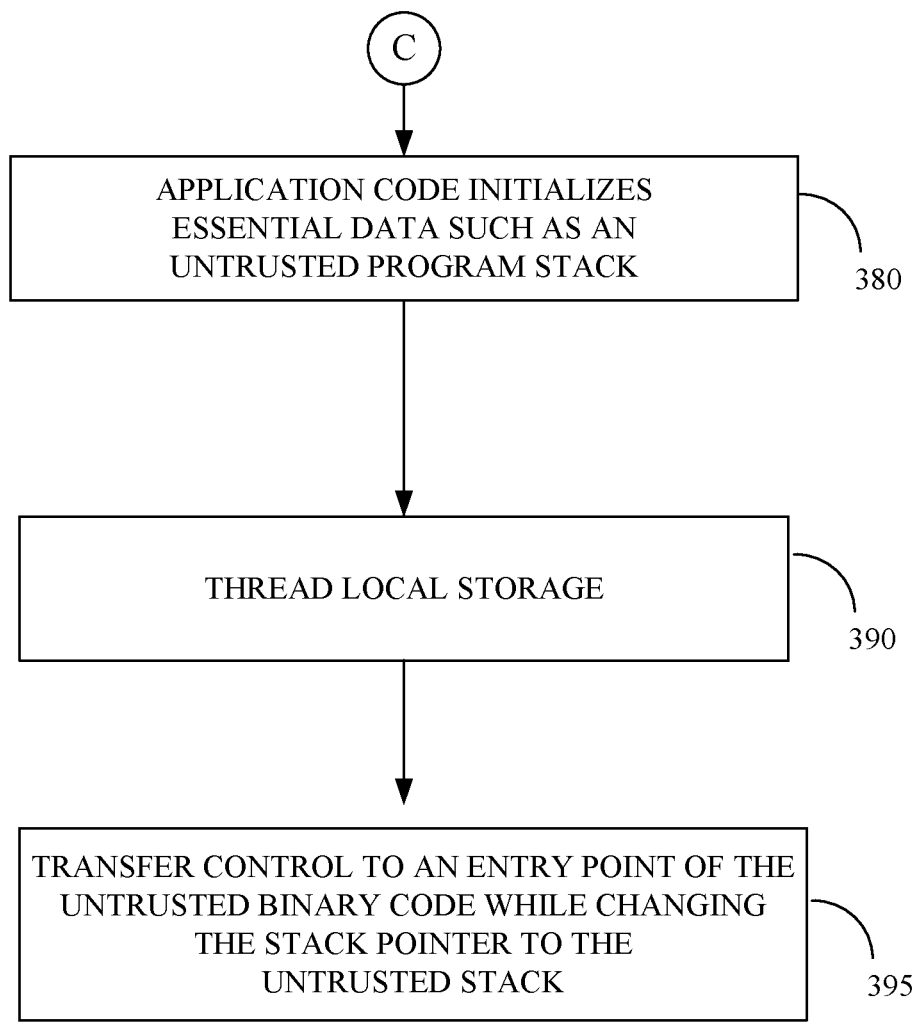

In block 330 of FIG. 6A, untrusted code may be executed in an isolated region of one or more of the memory regions. For example, when the binary is checked and memory permissions are properly set, application code may initialize essential data such as an untrusted program stack (block 380 of FIG. 6D), thread local storage (block 390 of FIG. 6D), and then it may properly transfer control to an entry point of the untrusted binary code while changing the stack pointer to the untrusted stack (block 395 of FIG. 6D). All of this initialization work may be done by special trampoline code that is generated for each untrusted domain.

According to exemplary embodiment, memory protection key permissions may be modified to update the untrusted code. According to another exemplary embodiment, the untrusted code may be prevented from accessing external memory and execution of the untrusted code outside of the isolated region may be prevented. Thus, the untrusted code may not be able to read and/or write to external memory. Trusted code, however, may be enabled to execute outside of the isolated region. Control transfers between the untrusted code and the trusted code may be restricted via a trampoline code path in trampoline memory regions. Additionally, the memory protection key may be applied to at least one code and data memory region of both the untrusted code and the trusted code.

According to an exemplary embodiment, the above-disclosed trusted and untrusted code may be control-flow-integrity enforcement instruction enabled and may each include an "endbranch" instruction. The "endbranch" instruction may be added to all trusted and untrusted code via the computing device/system. The "endbranch" instruction may be included at a beginning of a code path.

The method 300 may generally be implemented in a computing device or system. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. The logic may include transistor channel regions that are positioned (e.g., embedded) within one or more substrates. Thus, the interface between the logic and the one or more substrates may not be an abrupt junction. The logic may also be considered to include an epitaxial layer that is grown on an initial wafer of the one or more substrates.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 7:
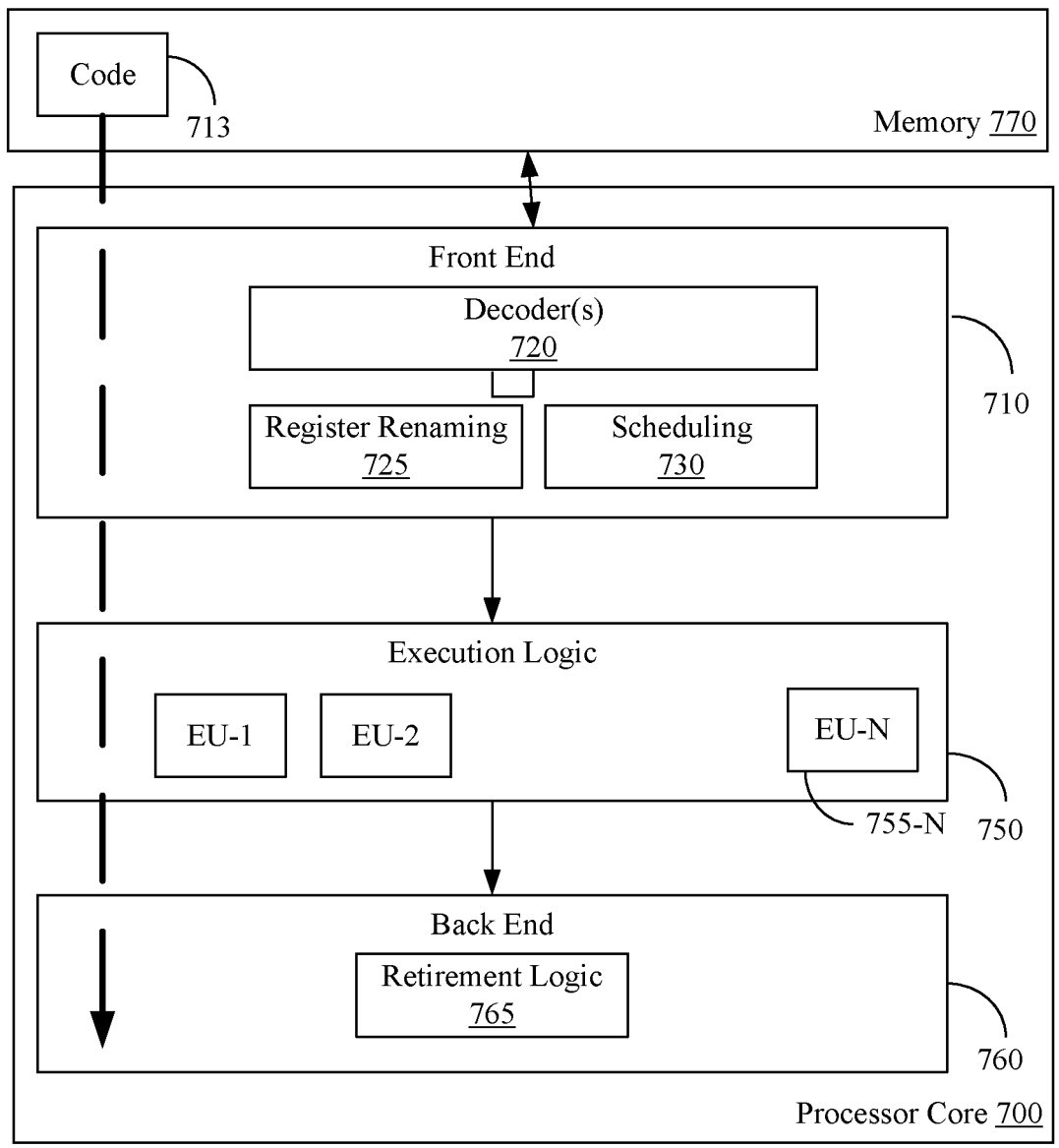
FIG. 7 is a block diagram of an example of a processor according to an embodiment.

FIG. 7 illustrates a processor core 700 according to one embodiment. The processor core 700 may be the core for any type of processor, such as a micro-processor, an embedded processor, a digital signal processor (DSP), a network processor, or other device to execute code. Although only one processor core 700 is illustrated in FIG. 7, a processing element may alternatively include more than one of the processor core 700 illustrated in FIG. 7. The processor core 700 may be a single-threaded core or, for at least one embodiment, the processor core 700 may be multithreaded in that it may include more than one hardware thread context (or "logical processor") per core.

FIG. 7 also illustrates a memory 770 coupled to the processor core 700. The memory 770 may be any of a wide variety of memories (including various layers of memory hierarchy) as are known or otherwise available to those of skill in the art. The memory 770 may include one or more code 713 instruction(s) to be executed by the processor core 700, wherein the code 713 may implement the method 300 (FIGS. 6A-6D), already discussed. The processor core 700 follows a program sequence of instructions indicated by the code 713. Each instruction may enter a front-end portion 710 and be processed by one or more decoders 720. The decoder 720 may generate as its output a micro operation such as a fixed width micro operation in a predefined format, or may generate other instructions, microinstructions, or control signals which reflect the original code instruction. The illustrated front end portion 710 also includes register renaming logic 725 and scheduling logic 730, which generally allocate resources and queue the operation corresponding to the convert instruction for execution.

The illustrated processor core 700 may include execution logic 750 having a set of execution units 755-1 through 755-N. Some embodiments may include a number of execution units dedicated to specific functions or sets of functions. Other embodiments may include only one execution unit or one execution unit that can perform a particular function. The illustrated execution logic 750 performs the operations specified by code instructions.

After completion of execution of the operations specified by the code instructions, back end logic 760 retires the instructions of the code 713. In one embodiment, the processor core 700 allows out of order execution but requires in order retirement of instructions. Retirement logic 765 may take a variety of forms as known to those of skill in the art (e.g., re-order buffers or the like). In this manner, the processor core 700 is transformed during execution of the code 713, at least in terms of the output generated by the decoder, the hardware registers and tables utilized by the register renaming logic 725, and any registers (not shown) modified by the execution logic 750.

Although not illustrated in FIG. 7, a processing element may include other elements on chip with the processor core 700. For example, a processing element may include memory control logic along with the processor core 700. The processing element may include I/O control logic and/or may include I/O control logic integrated with memory control logic. The processing element may also include one or more caches.

Figure 8:
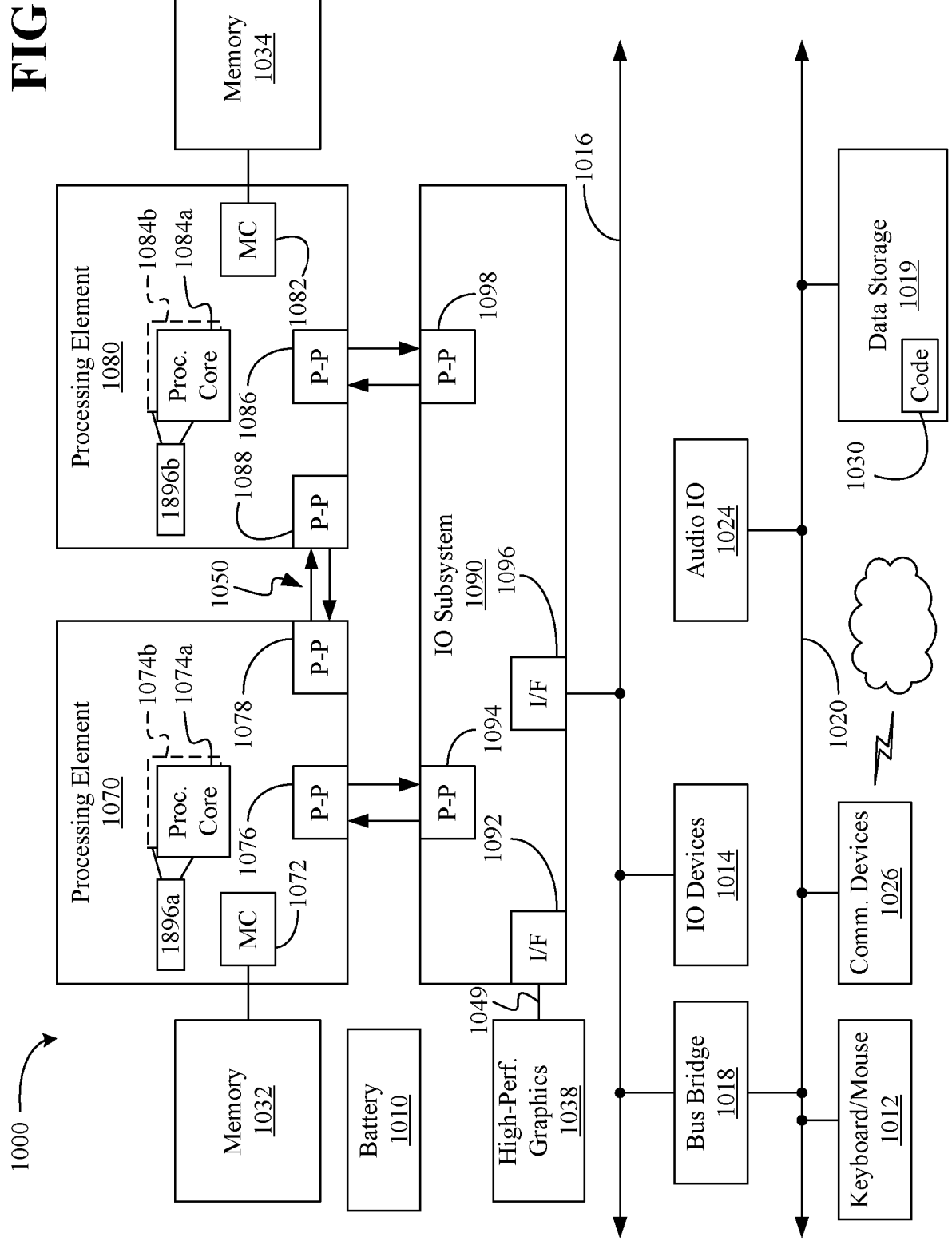
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high-performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 6A), already discussed, and may be similar to the code 713 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Figure 9:
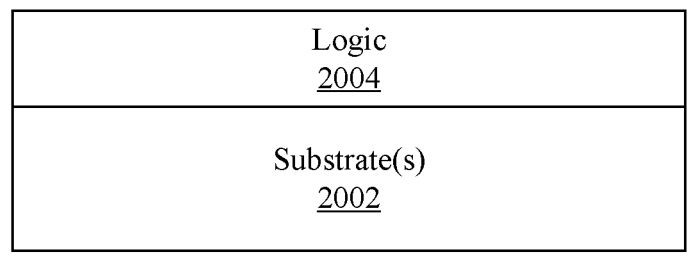
FIG. 9 is an illustration of an example of a semiconductor package according to an embodiment.

FIG. 9 shows a semiconductor package apparatus 2000. The apparatus 2000 may implement one or more aspects of the methods described herein. The illustrated apparatus 2000 includes one or more substrates 2002 (e.g., silicon, sapphire, gallium arsenide) and logic 2004 (e.g., transistor array and other integrated circuit/IC components) coupled to the substrate(s) 2002. The logic 2004 may be implemented at least partly in configurable logic or fixed-functionality logic hardware. In one example, the logic 2004 includes transistor channel regions that are positioned (e.g., embedded) within the substrate(s) 2002. Thus, the interface between the logic 2004 and the substrate(s) 2002 may not be an abrupt junction. The logic 2004 may also be considered to include an epitaxial layer that is grown on an initial wafer of the substrate(s) 2002.

Additional Notes and Examples

Example 1 may include a system comprising an isolated region among one or more memory regions and a semiconductor hardware device. The semiconductor hardware device may comprise one or more substrates and logic coupled to the substrate. The logic may be implemented at least partly in one or more of configurable logic or fixed-functionality hardware logic, and may apply a memory protection key to one or more memory regions, enforce one or more control flow constraints with respect to the one or more memory regions, and execute untrusted code in an isolated region of the one or more memory regions.

Example 2 may include the system of Example 1, wherein the logic coupled to the one or more substrates is to modify memory protection key permissions to update the untrusted code.

Example 3 may include the system of Examples 1 to 2, wherein the logic coupled to the one or more substrates is to prevent the untrusted code from accessing external memory and prevents execution of the untrusted code outside of the isolated region.

Example 4 may include the system of Examples 1 to 3, wherein the logic coupled to the one or more substrates is to enable execution of trusted code outside of the isolated region.

Example 5 may include the system of Examples 1 to 4, wherein the logic coupled to the one or more substrates is to restrict control transfers between the untrusted code and the trusted code via a trampoline code path in trampoline memory regions.

Example 6 may include the system of Examples 1 to 5, wherein the memory protection key is to be applied to at least one code and data memory region of both the untrusted code and the trusted code.

Example 7 may include the system of Examples 1 to 4, wherein the untrusted code and the trusted code are to be control-flow-integrity enforcement instruction enabled.

Example 8 may include the system of Examples 1 to 7, wherein each of the trusted code and the untrusted code reachable via an indirect branch include an "endbranch" instruction at a beginning of a code path.

Example 9 may include the system of Examples 1 to 8, wherein a memory read instruction is added after each "endbranch" instruction.

Example 10 may include the system of Examples 1 to 8, wherein the logic may include transistor channel regions that are positioned (e.g., embedded) within the one or more substrates. Thus, the interface between the logic and the one or more substrates may not be an abrupt junction. The logic may also be considered to include an epitaxial layer that is grown on an initial wafer of the one or more substrates.

Example 11 may include a semiconductor package apparatus comprising a substrate and logic coupled to the substrate. The logic is implemented at least partly in one or more of configurable logic or fixed-functionality hardware logic, and the logic is coupled to the substrate to apply a memory protection key to one or more memory regions, enforce one or more control flow constraints with respect to the one or more memory regions, and execute untrusted code in an isolated region of the one or more memory regions.

Example 12 may include the semiconductor package apparatus of Example 11, wherein the logic coupled to the one or more substrates is to modify memory protection key permissions to update the untrusted code.

Example 13 may include the semiconductor package apparatus of Examples 11 to 12, wherein the logic coupled to the one or more substrates is to prevent the untrusted code from accessing external memory and prevents execution of the untrusted code outside of the isolated region.

Example 14 may include the semiconductor package apparatus of Examples 11 to 13, wherein the logic coupled to the one or more substrates is to enable execution of trusted code outside of the isolated region.

Example 15 may include the semiconductor package apparatus of Examples 11 to 14, wherein the logic coupled to the one or more substrates is to restrict control transfers between the untrusted code and the trusted code via a trampoline code path in trampoline memory regions.

Example 16 may include the semiconductor package apparatus of Examples 11 to 15, wherein the memory protection key is to be applied to at least one code and data memory region of both the untrusted code and the trusted code.

Example 17 may include the semiconductor package apparatus of Examples 11 to 16, wherein the untrusted code and the trusted code are to be control-flow-integrity enforcement instruction enabled.

Example 18 may include the semiconductor package apparatus of Examples 11 to 17, wherein each of the trusted code and the untrusted code reachable via an indirect branch include an "endbranch" instruction at a beginning of a code path.

Example 19 may include the semiconductor package apparatus of Examples 11 to 18, wherein a memory read instruction is added after each "endbranch" instruction.

Example 20 may include the semiconductor package apparatus of Examples 11 to 19, wherein the logic may include transistor channel regions that are positioned (e.g., embedded) within the one or more substrates. Thus, the interface between the logic and the one or more substrates may not be an abrupt junction. The logic may also be considered to include an epitaxial layer that is grown on an initial wafer of the one or more substrates.

Example 21 may include a method comprising applying a memory protection key to one or more memory regions, enforcing one or more control flow constraints with respect to the one or more memory regions, and executing untrusted code in an isolated region of the one or more memory regions.

Example 22 may include the method of Example 21, wherein the method further comprises updating the untrusted code by modifying memory protection key permissions.

Example 23 may include the method of Examples 21 to 22, wherein the untrusted code that is to be executed in the isolated region cannot access external memory and cannot be executed outside of the isolated region.

Example 24 may include at least one computer readable storage medium comprising a set of instructions, which when executed by a computing device, cause the computing device to apply a memory protection key to one or more memory regions, enforce one or more control flow constraints with respect to the one or more memory regions, and execute untrusted code in an isolated region of the one or more memory regions.

Example 25 may include the at least one computer readable storage medium of Example 24 wherein the computing device is to update the untrusted code by modifying memory protection key permissions.

Example 26 may include the at least one computer readable storage medium of Examples 24 to 25, wherein the untrusted code that is to be executed in the isolated region cannot access external memory and cannot be executed outside of the isolated region.

Example 27 may include a semiconductor package apparatus for securely executing untrusted code, the semiconductor package apparatus comprising means for applying a memory protection key to one or more memory regions, means for enforcing one or more control flow constraints with respect to the one or more memory regions, and means for executing untrusted code in an isolated region of the one or more memory regions.

Example 28 may include the semiconductor package apparatus of Example 27, wherein the method further comprises updating the untrusted code by modifying memory protection key permissions.

Example 29 may include the semiconductor package apparatus of Examples 27 to 28, wherein the untrusted code that is to be executed in the isolated region cannot access external memory and cannot be executed outside of the isolated region.

One or more exemplary embodiments may be applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of one or more embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
an isolated region among one or more memory regions; and
a semiconductor hardware device, the semiconductor hardware device comprising:
one or more substrates; and
logic coupled to one or more substrates, wherein the logic is implemented at least partly in one or more of configurable logic or fixed-functionality hardware logic, the logic coupled to the one or more substrates to:
apply a memory protection key to one or more memory regions;
enforce control flow integrity with respect to the one or more memory regions; and
execute untrusted code in an isolated region of the one or more memory regions,
wherein the logic coupled to the one or more substrates is to enable execution of trusted code outside of the isolated region,
wherein each of the trusted code and the untrusted code reachable via an indirect branch include an endbranch instruction to mark a beginning of code path, and
wherein a memory read instruction is added after each endbranch instruction.

2. The system according to claim 1, wherein the logic coupled to the one or more substrates is to modify memory protection key permissions to update the untrusted code.

3. The system according to claim 1, wherein the logic coupled to the one or more substrates is to prevent the untrusted code from accessing external memory and prevents execution of the untrusted code outside of the isolated region.

4. The system according to claim 1, wherein the logic coupled to the one or more substrates is to restrict control transfers between the untrusted code and the trusted code via a trampoline code path in trampoline memory regions.

5. The system according to claim 1, wherein the memory protection key is to be applied to at least one code and data memory region of both the untrusted code and the trusted code.

6. The system according to claim 1, wherein the untrusted code and the trusted code are to be control-flow-integrity enforcement instruction enabled.

7. The system according to claim 1, wherein the logic coupled to the one or more substrates includes transistor channel regions that are positioned within the one or more substrates.

8. A semiconductor package apparatus comprising:
one or more substrates; and
logic coupled to the one or more substrates, wherein the logic is implemented at least partly in one or more of configurable logic or fixed-functionality hardware logic, the logic coupled to the one or more substrates to:
apply a memory protection key to one or more memory regions;
enforce control flow integrity with respect to the one or more memory regions; and
execute untrusted code in an isolated region of the one or more memory regions,
wherein the logic coupled to the one or more substrates is to enable execution of trusted code outside of the isolated region,
wherein each of the trusted code and the untrusted code reachable via an indirect branch include an endbranch instruction to mark a beginning of a code path, and
wherein a memory read instruction is added after each endbranch instruction.

9. The semiconductor package apparatus according to claim 8, wherein the logic coupled to the one or more substrates is to modify memory protection key permissions to update the untrusted code.

10. The semiconductor package apparatus according to claim 8, wherein the logic coupled to the one or more substrates is to prevent the untrusted code from accessing external memory and prevents execution of the untrusted code outside of the isolated region.

11. The semiconductor package apparatus according to claim 8, wherein the logic coupled to the one or more substrates is to restrict control transfers between the untrusted code and the trusted code via a trampoline code path in trampoline memory regions.

12. The semiconductor package apparatus according to claim 8, wherein the memory protection key is to be applied to at least one code and data memory region of both the untrusted code and the trusted code.

13. The semiconductor package apparatus according to claim 8, wherein the untrusted code and the trusted code are to be control-flow-integrity enforcement instruction enabled.

14. The semiconductor package apparatus of claim 8, wherein the logic coupled to the one or more substrates includes transistor channel regions that are positioned within the one or more substrates.

15. A method comprising:
applying a memory protection key to one or more memory regions;
enforcing control flow integrity with respect to the one or more memory regions;
executing untrusted code in an isolated region of the one or more memory regions;
enabling execution of trusted code outside of the isolated region;
providing an endbranch instruction to mark a beginning of a code path at each of the trusted code and the untrusted code reachable via an indirect branch; and
adding a memory read instruction after each endbranch instruction.

16. The method according to claim 15, further comprising updating the untrusted code by modifying memory protection key permissions.

17. The method according to claim 15, wherein the untrusted code that is to be executed in the isolated region cannot access external memory and cannot be executed outside of the isolated region.

18. At least one non-transitory computer readable storage medium comprising a set of instructions, which when executed by a computing device, cause the computing device to:
apply a memory protection key to one or more memory regions;
enforce control flow integrity with respect to the one or more memory regions;
execute untrusted code in an isolated region of the one or more memory regions;
enable execution of trusted code outside of the isolated region;
provide an endbranch instruction to mark a beginning of a code path at each of the trusted code and the untrusted code reachable via an indirect branch; and
add a memory read instruction after each endbranch instruction.

19. The at least one non-transitory computer readable storage of claim 18, wherein the computing device is to update the untrusted code by modifying memory protection key permissions.

20. The at least one non-transitory computer readable storage of claim 18, wherein the untrusted code that is to be executed in the isolated region cannot access external memory and cannot be executed outside of the isolated region.

* * * * *